United States Patent Office 3,287,155
Patented Nov. 22, 1966

3,287,155
PROCESS FOR IMPREGNATING GLASS FIBER MAT WITH METHYL METHACRYLATE POLYMER
George Edward Munn, Liftwood, Del., assignor to E. I. du Pont de Nemours and Company, Wilmington, Del., a corporation of Delaware
No Drawing. Filed Nov. 8, 1962, Ser. No. 236,407
The portion of the term of the patent subsequent to Apr. 2, 1980, has been disclaimed
2 Claims. (Cl. 117—54)

This invention relates to a process for polymerizing acrylic monomers, such as methacrylates, in the presence of a multi-component curing system. More particularly, the invention concerns the preparation of cured products from monomer-polymer syrups of methacrylic ester compositions in the presence of tin chloride and organic peroxides and a chain transfer agent such as a mercaptan.

An object of the present invention is to provide a process for preparing cured products from monomer-polymer syrups at rapid rates of cure. A further object is to provide monomer-polymer syrups containing specific ingredients which accelerate the cure. Another object is to provide a novel process for making laminates of fibrous materials and acrylic resins at increased rates of cure. Still another object is to provide stable and flowable syrups of monomer and polymer containing methacrylic esters and a process for molding, polymerizing and cross-linking the syrups in the presence of fibers to produce weather-resistant articles. Other objects and advantages of the invention will appear hereinafter.

The monomer-polymer syrups employed in the practice of this invention contain at least 5% and preferably not more than 50%, by weight of polymeric methyl methacrylate or copolymer containing methyl methacrylate as the principal component (the other component being methacrylic acid or a hydroxy alkane or hydroxy alkene ester thereof) in monomer methyl methacrylate. The syrups also contain about 0.01 to 1% by weight of a mercaptan, such as an alkyl mercaptan, a hydroxy alkane ester of mercaptoacetic acid, or hydroxy alkene ester of mercaptoacetic acid. The syrups also contain a tin chloride in quantities ranging from 5 to 10,000 parts/million, preferably 15 to 250 p.p.m. In particular embodiments, the syrups contain copper on a combined form in quantity of from 0.005 to 3.0 p.p.m.

A syrup of the kind hereinabove described can be mixed with or absorbed by fibrous materials and thereafter molded, polymerized, and cured to give weather-resistant articles. If desired, tin chloride can be applied to the surface of the fibrous material, in which event it need not be included in the syrup prior to contact with the fibrous material. An advantage of the latter technique resides in the longer pot life of the syrup. Another important advantage is the resultant increase in the pot life of any recovered excess of syrup which is drained or otherwise removed from the fibrous material in the form which is relatively free of the tin chloride which would otherwise be present in recycled excess syrup. The syrups employed in the practice of the invention should be flowable enough to permit easy use. The ratio of polymer to monomer should be such as to provide a minimum of shrinkage and a minimum of exothermic heat of polymerization consistent with good physical properties of laminated products. Moreover, when the monomer content of the syrup is low, the syrup can be polymerized to a product having superior wettability, and the herein-disclosed ingredients make it possible to complete the polymerization at a high reaction rate. The preferred tin chloride which may be used as a curing aid in the practice of the present invention is stannous chloride, $SnCl_2$. The soluble copper compounds can be any copper salt which is soluble in the syrup or monomer.

The quantity of mercaptan should preferably be such that it does not appreciably inhibit the polymerization during the stage of the process when the syrup is polymerized to a resin containing a minimum quantity of monomer which can be achieved in a short time, e.g., not longer than about 10 minutes.

The curing agent is preferably added to the syrup just prior to final polymerization. Suitable curing agents include hydrogen peroxide, organic hydroperoxides and the like. The preferred curing agents being teritary alkyl hydroperoxides (such as tertiary butyl hydroperoxide, p-methane hydroperoxide, and cumene hydroperoxide), tertiary butyl peresters, such as peracetates and perbenzoates, methyl ethyl ketone peroxide and lauryl peroxide. In general, the organic curing agents are tertiary peresters or tertiary hydroperoxides, i.e., peroxy compounds having tertiary carbon atoms directly united to a —O—O-Acyl or —OOH group. Mixtures of these peroxides with other peroxides may be used, if desired.

The monomer-polymer mixtures employed in the practice of the invention are preferably syrups having a bulk viscosity in the range of 0.5 to 50 poises, and contain methyl methacrylate polymer having an inherent viscosity of 0.25 to 1.0, preferably 0.3 to 0.55. The inherent viscosity is determined at 20° C. in chloroform solution at a concentration of 0.50 gram/100 ml., according to the method described in Textbook of Polymer Chemistry by F. W. Billmeyer, Interscience Inc. (1957) page 128. Suitable syrups include those described in the patent application of G. E. Munn, Serial No. 773,762, filed November 13, 1958 and now abandoned. An example illustrating the preparation of such a syrup is the following:

METHOD A

A solution containing 3.3 parts/weight of glycol di-mercaptoacetate and 1000 parts of methyl methacrylate monomer was heated to 80° C., at which temperature a mixture of 0.3 part alpha, alpha'-azobis-isobutyronitrile dissolved in 5.0 parts of methyl methacrylate monomer was added. The resulting composition was heated in a vessel equipped with a reflux condenser, the temperature of the vessel contents being maintained at 100–103° C. When the viscosity of the mixture reached 10 poises (measured at 25° C.), the polymerization was stopped by cooling the solution to 25° C., and adding 0.38 part of hydroquinone per 80 parts of methyl methacrylate monomer. The total reaction time was about 40 minutes. The resulting syrup had a polymer content of about 31% and inherent viscosity of 0.37. It did not undergo any color change or viscosity change on being stored at room temperature for 30 days.

If desired, the syrup can be prepared by dissolving a similar amount of polymer having the prescribed inherent viscosity in the monomer. However, formation of the syrup by partial polymerization of monomer is the preferred method. As hereinabove noted, the mercaptan is present during polymerization of the methyl methacrylate when the syrup is made by the latter method. In order to restrict the polymerization of the monomer during the preparation of the syrup, it is desirable to introduce only sufficient polymerization initiator to produce the desired amount of polymer, since in this way optimum storage stability is obtained. Any of the well-known polymerization initiators may be employed in preparing the syrup. The quantity of initiator is from 50 to 5000 parts/million during the syrup preparation stage, preferably from 100 to 500 parts/million (based upon the weight of the monomer-polymer mixture).

The amount of polymer which is present in the monomer-polymer mixture is preferably controlled to meet the requirements of the particular use to which the syrup will be applied during the final curing. For example, when laminating articles containing fibers, fillers, or the like are to be made, the viscosity at 25° C. should preferably be about 2 to 20 poises, and in general not greater than 50 poises. In general, these low viscosity syrups can be prepared by the method hereinabove described or by mixing low viscosity polymer with a sufficient amount of monomer. A higher proportion of monomer can be used to obtain the same bulk viscosity if the inherent viscosity of the polymer is relatively high.

When the syrup is prepared by partial polymerization, the temperature of the reaction mixture should be maintained between 50 and 150° C., preferably 95° to 105° C.

It is, of course, not essential that the syrups which are to be employed in the practice of the present invention, have a long shelf life since in particular embodiments the syrups may be employed immediately after they have been prepared. The mercaptans do not materially influence the degree of stability of the syrup.

The quantity of peroxide curing agent which is present during the final cure, should be within the range of about 0.01 to 2.0% based on the weight of the syrup. The final cures are accomplished by heating the mixture high enough to produce rapid reaction, but not so high as to produce blemishes, such as bubbles, flow lines, etc. When conditions are such that the rate of heat transfer is low, the monomer content should be kept comparatively low since this results in low exothermicity during the shaping and final polymerizations.

In one of the most important embodiments of the invention, the syrup is used to impregnate glass fiber mat which is coated with tin chloride. When this is done, any excess quantity of syrup or drainage thereof can be removed from the resultant mat, and it is surprising that the excess liquid which is recovered is sufficiently stable to be stored and reused for impregnation of a further quantity of glass fiber mat coated with tin chloride. The glass fibers preferably constitute about 25 weight percent based on the resin, so that the tin chloride is present on the glass fibers in an amount of from 60 to 1000 p.p.m.

During the final cure, the polymerization mixture can be shaped in any desired manner; for example, castings can be prepared by carrying out the final polymerization in a mold or other confined space. Similarly, shaped articles can be made from laminated compositions, especially those containing glass fibers. A suitable temperature for the final curing reaction is within the range of about 20° to 150° C. In some instances, vaporization of the monomer can accompany the final curing reaction. However, the tendency of the monomer to volatilize is greatly reduced by the presence of the polymer and because the monomer is so rapidly converted to polymer when the initiator systems herein-described are used.

It is quite surprising that the tin chloride produces gelation in the presence of other ingredients at a rapid rate.

In the examples which follow, it is to be understood that the gel times represent measurements which reflect the utility of the compositions in the manufacture of shaped articles at rapid rates of cure. From a practical standpoint in the manufacture of useful objects it is desirable to employ reaction times somewhat longer than the gel times reported in the examples. In all instances, a reaction time which is twice as long as the gel time is entirely adequate in the manufacture of useful objects, such as moldings, sheetings, etc. The gel times can be defined as the time required to produce a rapidly changing viscosity in the range of 200 to 300 poises. Any suitable instrument such as a calibrated rotating glass bar in a vessel containing the syrup can be used for determining gel times. A gel time meter manufactured by the Sunshine Scientific Instrument Co. of Philadelphia, Pennsylvania was used for the example shown in the accompanying table.

The invention is illustrated further by means of the following examples.

*Example I*

In a series of runs employing methyl methacrylate monomer-polymer syrup prepared in accordance with the Method A shown above, the composition of the initiator system was varied as described in the following table. The gel times were measured at 40° C. As will be seen from the table, the gel times were of short duration as compared with the gel time of the control composition.

TABLE I

| | $SnCl_2 \cdot 2H_2O$ (p.p.m.) | CuNAP (p.p.m.) | 40° C. Gel Time (minutes) |
|---|---|---|---|
| "Lupersol" 7, percent: | | | |
| 0.12 | 100 | 10 | 20.2 |
| 0.20 | 100 | 10 | 16.2 |
| 0.12 | 200 | 10 | 17.8 |
| 0.20 | 200 | 10 | 14.8 |
| 0.40 | 200 | 10 | 11.4 |
| 0.60 | 200 | 10 | 9.8 |
| 0.25 | | | 175 |
| t BHPO, percent: | | | |
| 0.1 | 100 | 10 | 44.1 |
| 0.1 | 200 | 10 | 39.0 |
| 0.2 | 100 | 10 | 39.5 |
| 0.2 | 200 | 10 | 35.8 |
| DDM, percent: | | | |
| 0.1 | 100 | 10 | 43.9 |
| 0.1 | 500 | 10 | 40.1 |
| 0.2 | 100 | 10 | 40.5 |
| 0.2 | 500 | 10 | 38.5 |
| 0.1 | | | 1,000 |
| 0.2 | 500 | | 104 |

Abbreviations:
t BHPO = t-Butyl Hydroperoxide.
CuNAP = Copper Naphthenate.
DDM = "Lupersol" DDM, a commercial preparation of methyl ethyl ketone peroxide.
"Lupersol" 7 = A commercial preparation of t-butyl peracetate.

*Example II*

A glass fiber mat was soaked with an equal weight of methanol containing 0.1% by weight of $SnCl_2$, following which the methanol was removed by vaporization. The resulting dry mat was impregnated with three times its weight of monomer-polymer methyl methacrylate syrup, prepared in accordance with Method A, to which 0.5% by weight of lauryl peroxide, 0.1% of tertiary butyl hydroperoxide and 10 parts/million of copper naphthenate were added. The composition was placed in a cellophane envelope, and 10% of the syrup was recovered in a form suitable for use in impregnating additional glass fibers. The syrup, unretained by the mat, was kept for five hours without any apparent change, at room temperature. In comparison, a similar syrup in which the tin chloride was present without having been introduced as a coating on glass fiber, underwent exothermic polymerization on standing at room temperature for one hour. The mixture remaining in the cellophane envelope was pressed gently (about 0.1 p.s.i.) to produce a sheet $\frac{1}{16}$ inch thick. This was cured by heating in an oven at 127° to 131° F. for 30 minutes. The resulting sheet, when cooled and separated from the cellophane, was tough, strong, and colorless (as it appeared to the naked eye).

*Example III*

To 1000 parts methyl methacrylate monomer was added 1 part lauryl peroxide, 1 part t-butyl hydroperoxide, .15 part $SnCl_2 \cdot 2H_2O$, 2 parts lauryl mercaptan, $1 \times 10^{-2}$ part copper naphthenate. The mixture was poured into a cell composed of 2 sheets of plate glass separated by a $\frac{1}{8}$ vinyl gasket and placed on a forced air oven at 65° C. After 65 minutes, a hard, clear, colorless sheet was obtained.

It is to be understood that the foregoing examples are intended to illustrate the operability of the invention and other embodiments will be apparent to those who are skilled in the art. The invention can be used in the production of large corrugated sheets for construction purposes, smaller sheets for glazing, especially in greenhouses and the like, cast sheet from monomer with no reinforcement, tubing, containers, bottles, complex shapes including decorative objects and encapsulations of decorative objects. It is also to be understood that ethylacrylate, cyclohexyl methacrylate, etc. can be used in place of at least a part of the methyl methacrylate monomer-polymer. The glass fiber reinforcement can be replaced in whole or in part by fillers such as titanium, silica, carbon black, polyolefin fibers, powdered metals or any other fillers suitable for use in acrylic resins. Suitable dyes, pigments, may, of course, also be added if desired.

I claim:
1. A process for preparing polymerizates from methyl methacrylate monomer-polymer mixture which comprises maintaining said mixture at a temperature of 20° to 65° C. in the presence of an initiator system consisting essentially of 0.01 to 1.0% by weight based on the total mixture of a mercaptan, 5 to 10,000 parts/million by weight based on the total mixture of $SnCl_2$, up to 3.0 parts/million by weight based on the total mixture of copper in dissolvable form, and 0.01 to 2.0% by weight based on the total mixture of a peroxide curing agent.

2. A process which comprises impregnating a glass fiber mat with a methyl methacrylate monomer-polymer syrup containing from 5 to 50% by weight of methyl methacrylate polymer and complementally from 95 to 50% by weight of methyl methacrylate, said syrup having a bulk viscosity in the range of 0.5 to 50 poises, and containing methyl methacrylate polymer having an inherent viscosity of 0.25 to 1.0, said syrup having admixed therein, 0.01 to 1.0% by weight of a mercaptan, up to 3.0 parts/million of copper in dissolvable form, and 0.01 to 2.0% of a peroxide curing agent, said fiber mat having $SnCl_2$ coated thereon in quantity of 15 to 250 parts/million parts of said syrup, and removing from the resultant mat, the excess of impregnating liquid, which is unretained by the mat, said excess liquid being sufficiently stable to be thus recovered, and re-used for the impregnation of $SnCl_2$-coated glass fiber mat.

References Cited by the Examiner

UNITED STATES PATENTS

| | | | |
|---|---|---|---|
| 2,171,765 | 9/1939 | Rohm et al. | |
| 2,245,783 | 6/1941 | Hyde | 117—126 X |
| 2,331,944 | 10/1943 | Von Pazsiczky | 117—126 X |
| 2,485,194 | 7/1949 | Nyquist et al. | 117—54 |
| 2,577,936 | 12/1951 | Waggoner | 117—126 X |
| 2,584,763 | 2/1952 | Waggoner | 117—126 X |
| 2,651,585 | 9/1953 | Lytle et al. | 117—54 X |
| 2,664,376 | 12/1953 | Phillips | 117—126 X |
| 2,684,305 | 7/1954 | Quinlivan | 117—126 |
| 2,687,395 | 8/1954 | Marks | 260—89.5 X |
| 2,702,253 | 2/1955 | Bergstrom | 117—54 X |
| 3,084,068 | 4/1963 | Munn | 117—126 X |

WILLIAM D. MARTIN, *Primary Examiner.*

R. HUSACK, *Assistant Examiner.*